United States Patent [19]

Lippert

[11] Patent Number: 5,376,408
[45] Date of Patent: Dec. 27, 1994

[54] SPIN DEPOSITION OF A NONCONFORMAL COATING SURFACE TO MACHINED OPTICAL ASPHERE SURFACES

[75] Inventor: Thomas M. Lippert, Princeton, N.J.

[73] Assignee: Honeywell Inc., Minneapolis, Minn.

[21] Appl. No.: 996,283

[22] Filed: Dec. 23, 1992

[51] Int. Cl.⁵ .............................................. B05D 3/12
[52] U.S. Cl. ..................................... 427/240; 118/52; 118/55; 118/620; 427/162; 427/164; 427/508; 427/512; 427/385; 427/393.5
[58] Field of Search ............... 427/512, 162, 240, 508, 427/385.5, 393.5; 118/164, 620, 52, 55

[56] References Cited

U.S. PATENT DOCUMENTS

| | | | |
|---|---|---|---|
| 3,410,636 | 11/1968 | Herrick | 350/288 |
| 3,458,348 | 7/1969 | Sherman | 117/138.5 |
| 4,147,565 | 4/1979 | Puyplat | 148/6.15 |
| 4,242,412 | 12/1980 | Funaki et al. | 428/412 |
| 4,417,790 | 11/1983 | Dawson et al. | 351/166 |
| 4,449,478 | 5/1984 | Kraus | 118/720 |
| 4,556,605 | 12/1985 | Mogami et al. | 428/331 |
| 4,615,847 | 10/1986 | Howden | 264/1.7 |
| 4,826,553 | 5/1989 | Armitage et al. | 156/223 |
| 4,852,436 | 8/1989 | Benjamin | 82/19 |
| 4,895,102 | 1/1990 | Rachel et al. | 118/52 |
| 5,131,969 | 7/1992 | Gamble et al. | 156/196 |

OTHER PUBLICATIONS

Alan DeCew, Precision Optical Fabrication Through Hybrid Processing, Jun. 1987.

J. David Briers, Andy Devlin, Aspheric Optics By Diamond Machining, Photonics Spectra 89, Dec. 1986.

*Primary Examiner*—Janyce Bell
*Attorney, Agent, or Firm*—Craig J. Lervik

[57] ABSTRACT

A method of coating a machined surface of a plastic optical element includes providing a holder having a rotational axis therethrough for receiving the optical element such that the machined surface is openly receptive to the coating material. The optical element is positioned within the holder. The machined surface is then wetted with the coating material and the holder is spun about an axis to form a nonconformal coating material surface on the machined surface. The nonconformal coating material surface on the machined surface is then cured. The machined surface is an optical asphere. An apparatus for coating a machined surface of an optical element with a coating material includes a holding member having an axis therethrough and a cavity portion for accepting the optical element therein. The holding member has its weight substantially equally distributed about the axis after the element is inserted in the cavity. The cavity being positioned such that when the element is inserted therein the machined surface of the element is openly receptive to the coating material. The apparatus further includes means for applying the coating material to the machined surface, means for rotating the holding member about the axis to form a nonconformal coating material surface on the machined surface, and means for curing the coating material surface on the machined surface.

19 Claims, 4 Drawing Sheets

SPIN DEPOSITION OF A NONCONFORMAL COATING SURFACE TO MACHINED OPTICAL ASPHERE SURFACES

FIELD OF THE INVENTION

The present invention pertains to the coating of surface machined optical elements. In particular, the invention pertains to a spin deposition method and apparatus for forming a nonconformal coating surface on machined optical elements such as optical aspheres.

BACKGROUND OF THE INVENTION

In many optical designs, solid-glass optical components are used to provide redirection of optical imaging therethrough. However, the use of solid-glass optical components may introduce a large amount of weight into a design, rendering the design unusable. For example, various optical systems are used in conjunction with headgear of aviation navigators. Such optical systems may include combiner elements. The combiner elements may be prismatic with two parallel flat surfaces for internal reflection of light therethrough. In many high performance optical systems, combiners require high quality aspheric surfaces to improve the performance of such systems and correct for distortion of image rays and wavefronts in the system. However, high-quality aspheric surfaces are very expensive to produce, requiring the services of highly skilled personnel. Thus, an optical system constructed of glass components may result in headgear that is too heavy to serve its intended purpose and be cost prohibitive.

As is known to one skilled in the art, the use of plastic to produce light weight elements can solve the problem associated with the weight of glass components. The surfaces of such plastic components can be machined to many geometric shapes, including aspheric surfaces. One method of such machining is the use of diamond turning as described in U.S. Pat. No. 4,852,436 to Benjamin or as is generally known to one skilled in the art. Such diamond turning produces a substantially symmetrical surface about a center point of the asphere.

The machining of surfaces on plastic optical elements is difficult because of the softness and other physical characteristics of the material. Such machining, such as diamond turning, does not produce a completely smooth surface. The diamond turning, for example, produces an aspheric surface on a plastic optical element which has many radial ridges on the aspheric surface symmetric about the center point. In high performance systems, such ridges produced by the diamond turning can create a haze from diffraction or light scattering due to the microscopic defects or ridges as light passes through the optical element.

In addition, because the diamond turning creates a surface which is symmetric about a center of an aspherical surface designed to correct for distortion of image rays, a certain degree of astigmatism may be created by such aspherical shape. Such haze and astigmatism is unacceptable when the optical element is used in vision type systems. Therefore, there exists a need to reduce the effect of such problems associated with the diamond turned plastic asphere surfaces.

SUMMARY OF THE INVENTION

The present invention is directed to an apparatus and method for spin depositing a coating material surface on machined surfaces of a plastic optical element. In one embodiment of the invention, a coating method includes providing a holder having a rotational axis therethrough for receiving said optical element such that said machined surface is openly receptive to a coating material. The optical element is positioned within the holder. The surface is wetted with the coating material and the holder is spun about the axis to form a nonconformal coating material surface on the machined surface. The nonconformal coating material surface is then cured.

In accordance with another embodiment of the invention, the machined surface of the optical element is an optical asphere and the optical asphere has a center about which the asphere is machined. The holder has a cavity portion positioned for accepting the optical element such that the optical element is openly receptive to contact with the coating material. Support for the optical element in the cavity is provided such that the element is centrifugally stabilized in a position as the holder is spun.

In other embodiments of the invention, the asphere center is aligned with the rotational axis and a tangent at the center of the asphere is either transverse with or at a predetermined angle to the rotational axis. In addition, the asphere center can be offset from the rotational axis and the tangent at the center of the asphere is either transverse to or at a predetermined angle with the rotational axis.

In yet another embodiment of the invention, the optical aspheres are machined by diamond turning and such turning leaves a plurality of ridges on the machined surfaces. Grooves between the plurality of ridges are filled with the coating material as the holder is spun and a nonconformal coating material surface is formed on the asphere after the grooves are filled as the holder is spun.

The apparatus for coating a machined surface of an optical element with a coating material according to the present invention includes a holding member having a rotational axis therethrough and a cavity portion for accepting the optical element therein. The cavity is positioned such that when the element is inserted in the cavity that the machined surface of the element is openly receptive to the coating material. The apparatus further includes means for applying the coating material to the machined surface, means for rotating the holding member about the axis to form a nonconformal coating material surface on said machined surface, and means for curing the nonconformal coating material surface applied to the machined surface.

DESCRIPTION OF THE PREFERRED EMBODIMENT

Figure 1:
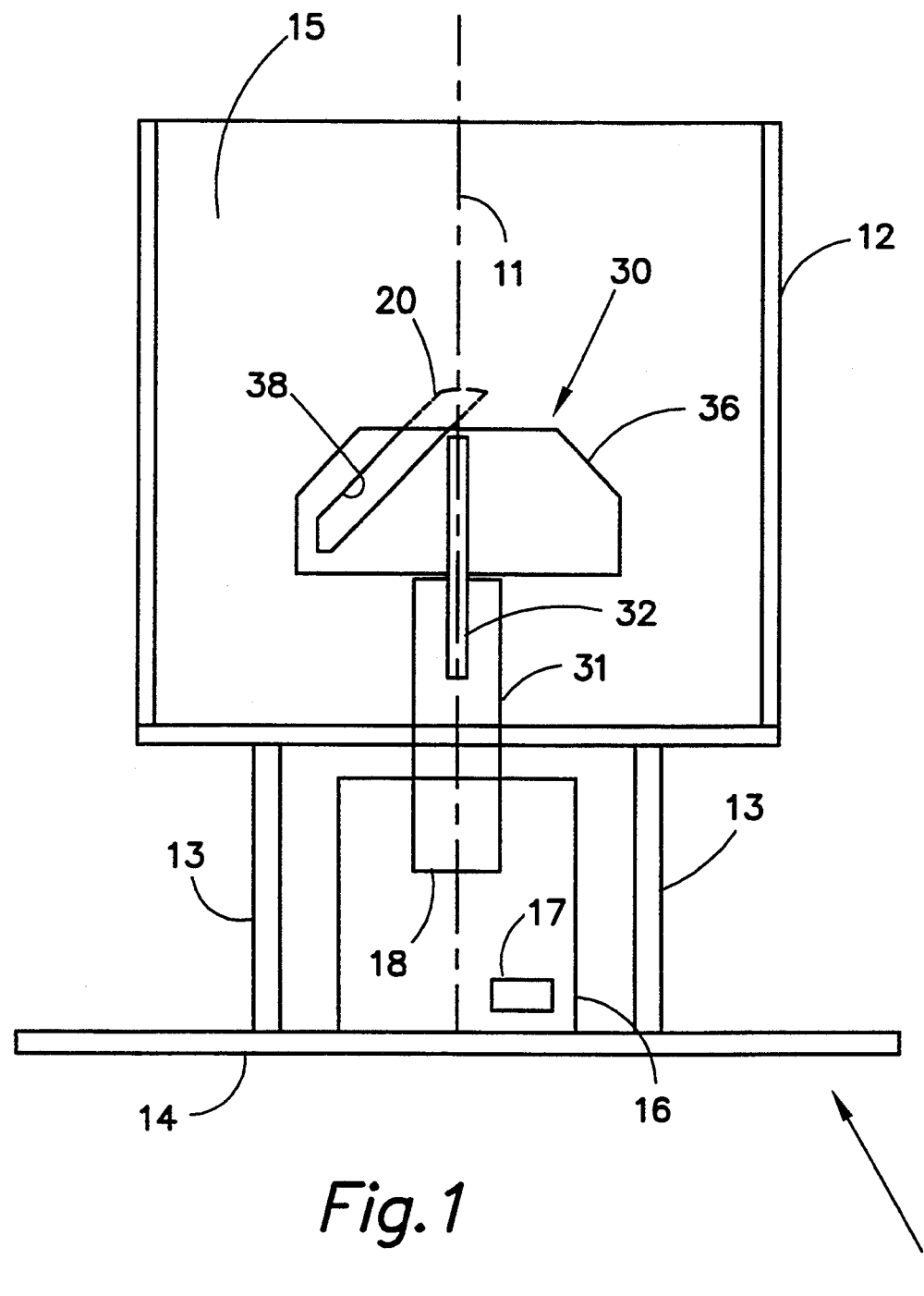
FIG. 1 is a front view of the spin deposition apparatus of the present invention.

In accordance with the principles of the present invention, an apparatus and method for coating an optical asphere machined on a plastic optical element shall be described with reference to FIGS. 1-8. A coating apparatus 10 includes a base 14 upon which a chamber 12 is connected via a plurality of columns 13. The chamber 12 is a cylindrical structure which during the spin deposition method of the present invention is positioned in a laminar flow chamber (not shown) to exhaust the system during performance of the method.

The coating apparatus 10 further includes a motor 16 activated by power switch 17 and controlled by a speed control (not shown). The motor 16 imparts rotational motion about rotational axis 11 to an optical element holder 30 by means of bearings 18, the connecting element 31 of the motor 16 and coaxial portion 32 of the optical element holder 30. The connection between connecting element 31 and coaxial portion 32 is a simple slotted connection such that rotation of connecting element 31 imparts motion to coaxial portion 32 and thus holder 30. Any appropriate connection which allows for rotational motion to be imparted to the optical element holder 30 is contemplated hereunder and intended to be within the scope of the present invention.

Figure 5:
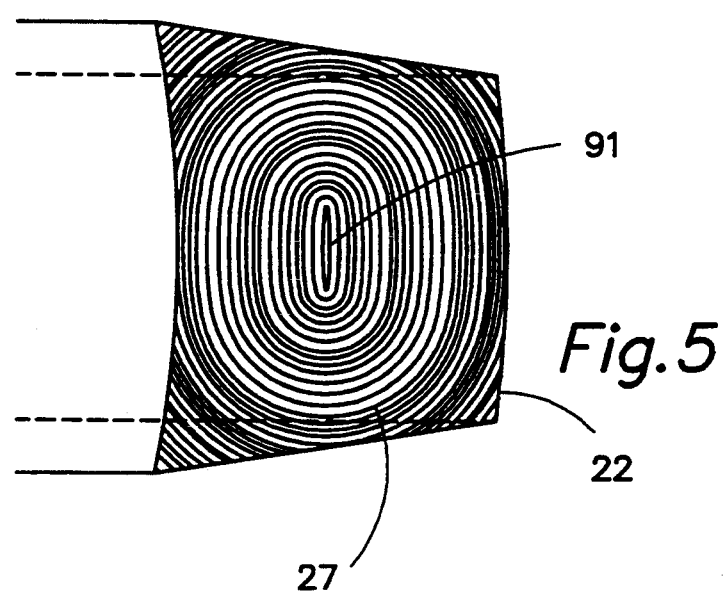
FIG. 5 is an enlarged portion of an asphere of the optical element of FIGS. 2–4.
Figure 6:
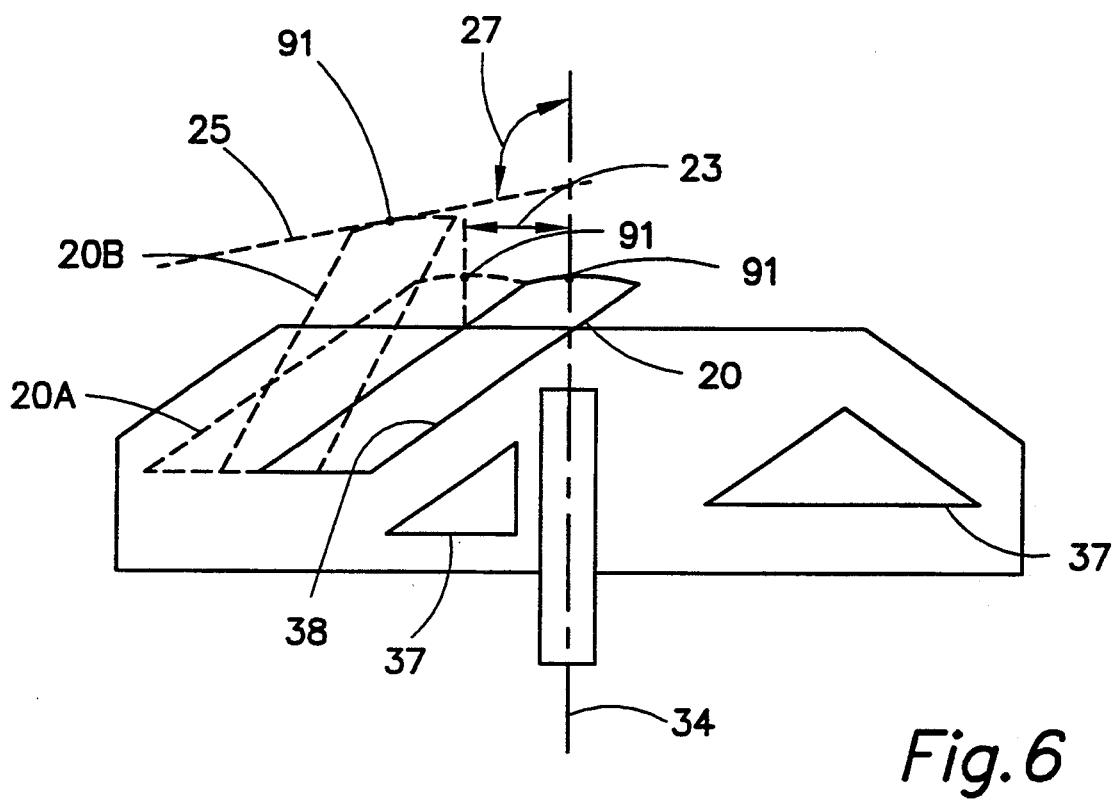
FIG. 6 is a side view of an optical element holder of FIG. 1.
Figure 7:
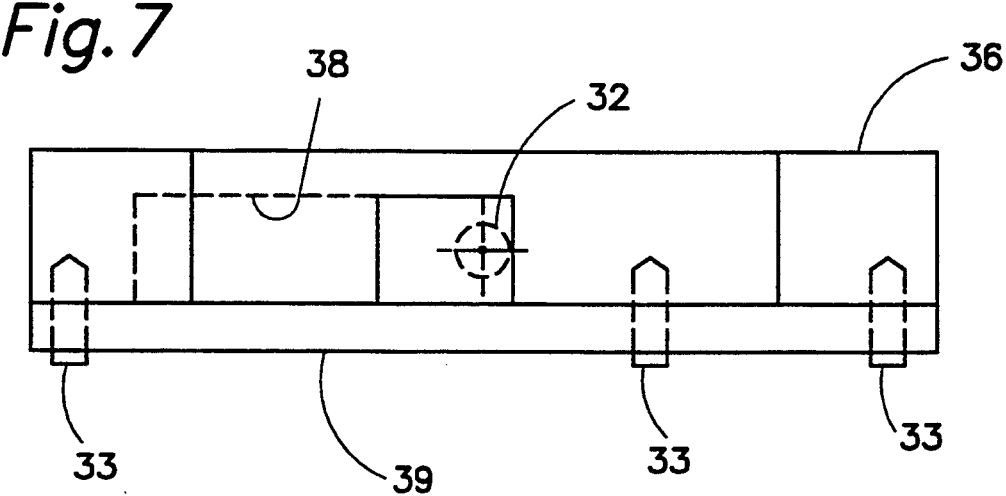
FIG. 7 is a top plan view of the holder shown in FIG. 6.

The optical element holder 30 is shown in further detail in FIG. 6 and FIG. 7. The holder 30 includes a rectangular-like shaped body 36 and a cover portion 39 which is attachable to the body 36 by appropriate fastener means 33. A central axis 34 is shown extending generally through the center of the body 36 with the cover 39 attached. The coaxial portion 32 is coaxial about the axis 34 and extends through a portion of the body 36 and outward therefrom for attachment to motor 16 via connecting element 31. Body 36 includes a cavity 38 shaped for acceptance of an optical element 20, FIGS. 2-5. Prior to attachment of cover 39 to body 36, a larger opening for insertion of the optical element 20 within the cavity 38 is present. This enlarged opening facilitates insertion of the optical element 20 therein.

Figure 2:
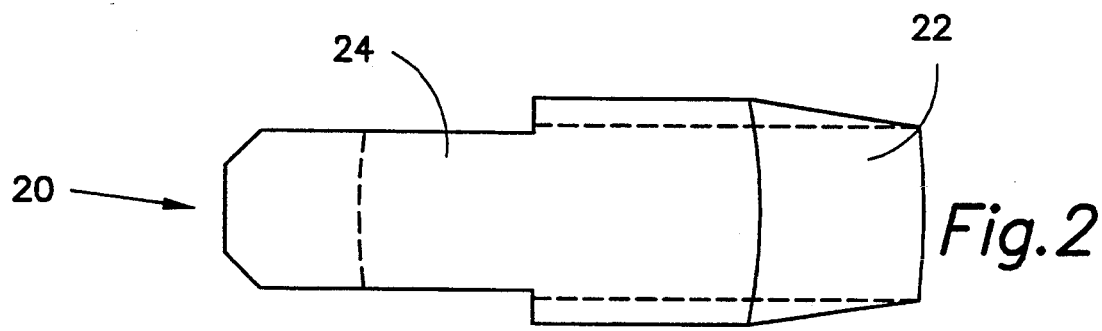
FIGS. 2, 3 and 4 are a bottom plan view, a side view, and a top plan view, respectively, of an optical element to be coated by the method and apparatus of the present invention.
Figure 3:
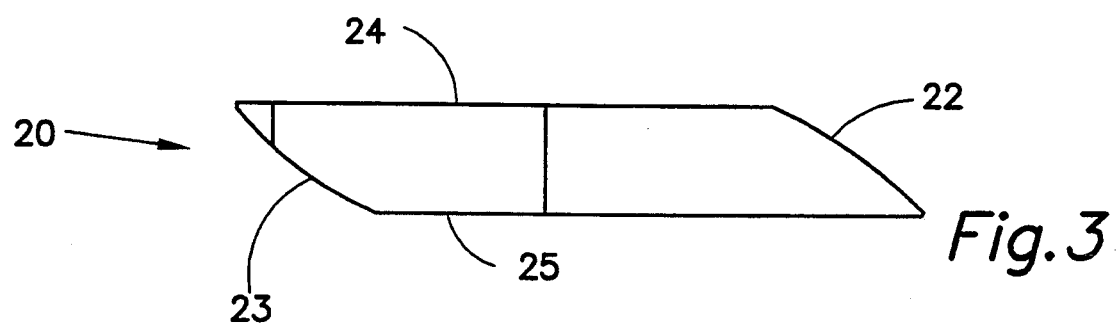
Figure 4:
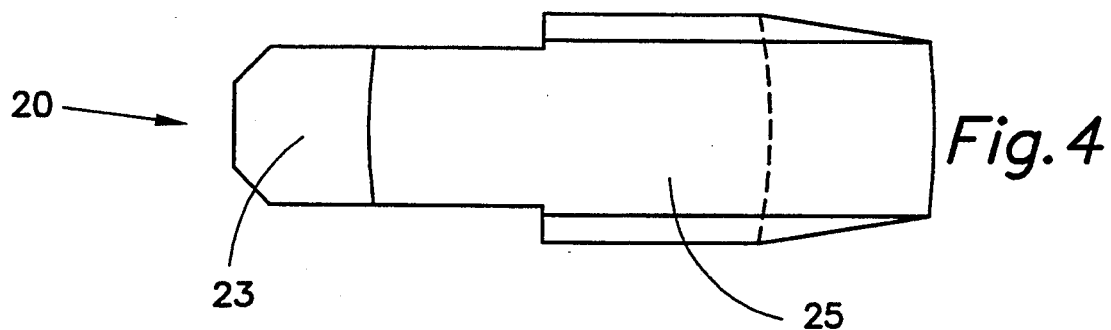

The optical element 20, an optical combiner, includes a first optical asphere 23 which is machined at a first end of the optical element 20. On a second end opposite the first end of the optical element 20, a second optical asphere 22 is machined. The optical element 20 further includes a parallel top surface 25 which is parallel to a bottom surface 24 along with two side surfaces shaped as shown in FIGS. 2 and 4. The top surface 25 and the bottom surface 24 are parallel for internal reflection of image rays or wavefronts traveling therethrough. The optical element 20 is machined from a plastic material, acrylic. The optical aspheres 22, 23, necessary in the combiner 20 to correct for distortions of the optical system, are machined by means of diamond turning. Such diamond turning processes are known to those skilled in the art thereof. However, as shown in FIG. 5, such a diamond turned aspheric surface 22 includes a plurality of ridges 27 thereon with grooves formed therebetween; the ridges 27 being symmetric about a center of the asphere. When utilizing an optical element 20 having a plurality of ridges 27 thereon, images projected therethrough contain haze from light scattering due to these slight imperfections. The grooves between the ridges 27 are filled and the surface is smoothed by the spin deposition coating method of the present invention with the use of coating apparatus 10 as described further below.

Although use of such aspheres may correct for distortions or aberrations in the optical system, the asphere may create an additional problem. A varying degree of astigmatism is introduced into the optical system due to the contour of the asphere. Such astigmatism creates further visual problems with an image transmitted therethrough. A fringe pattern 94 of the asphere prior to coating is shown by the dashed diagram in FIG. 8. This dashed fringe pattern is created about the center 91 of the asphere 22. The fringe pattern 96 of the optical asphere 22, coated in conjunction with the present invention to form a nonconformal surface on the asphere, is shown in solid line form. The linear offset 99 of the center 93 of fringe pattern for the nonconformally coated asphere from the center 91 of the asphere without the nonconformal surface, in conjunction with the increase of fringes toward the outer edges and reduction of fringes about the offset center 93 indicates a reduction in the astigmatism problem. Such reduction is accomplished by forming a nonconformal hard coating layer on the aspheric surface with the spin deposition method of the present invention.

The cavity 38 of optical element holder 30 is positioned in the body 36 of holder 30 such that when the optical element 20 is positioned therein, the center 91 of the optical asphere 22 lies on the axis 34. In addition, the cavity 38 is positioned such that a tangent at the center of the optical asphere 22 lies substantially transverse to axis 34; the optical asphere 22 lying coaxial thereabout. When the optical element 20 is inserted in the cavity 38 which is lying at an angle to axis 34, the optical element 20 is centrifugally stabilized in the cavity 38 as the holder 30 is spun. As will be explained further below with regard to the method of the present invention, the position of the asphere when it is deposited with hard coating may be modified in order to create a nonconformal coating applicable to a particular application.

Cutout portions 37 are made to body 36 or cover 39 such that the weight of the optical holder 30 is substantially evenly distributed about axis 34 when the optical element 20 is inserted in cavity 38. Optical element 20 may also be positioned in cavity 38 such that optical asphere 23 has its center on axis 34. Because of the weight differences, as is apparent from FIGS. 2 and 4, in the various sections of the optical element 20, weights can be added to either side of body 36 in order to offset any weight distribution caused by the insertion of optical element 20 in order to coat optical asphere 23 instead of optical asphere 22. Such weight distribution is necessary to allow for balanced spin of holder 30 about axis 34.

The spin deposition method of coating a machined optical asphere of a plastic optical element 20 shall now be described with reference to FIGS. 1-7. The optical element 20, a combiner, is first prepared for insertion into optical element holder 30 by cleaning and masking the optical element 20. The cleaning of the optical element removes any impurities thereon such that the coating material deposited on the machined surfaces of the optical element will bond successfully. In the preferred embodiment, the optical element 20 is wiped to remove oils from the surfaces. The optical element 20 is then laid in a solution of 1%-3% microdetergent per deionized water solution for 30-60 minutes. The surfaces are scrubbed with a soft material such as cotton balls soaked in a similar or same solution. The element is rinsed thoroughly with running deionized water. Filtered nitrogen, $N_2$, is used to blow dry the optical element 20 and then the element 20 is baked for about 2 hours at about 50° C. The element 20 is then allowed to cool to room temperature in a laminar flow structure.

After the optical element 20 has been cleaned to remove impurities, all the surfaces of the optical element 20 which are not to be coated with the coating material during spin deposition must be masked in order to prevent coating from bonding to these particular surfaces. For example, when the spin deposition method is to coat optical asphere 22, all the surfaces except for optical asphere 22 would be masked. These surfaces are masked with various products, including cellophane wrap, printed circuit board masking tape #851 manufactured by 3M Inc. and/or various other masking items which serve the appropriate purpose.

After the optical element has been cleaned and masked, the optical element 20 is then mounted into cavity 38 of body 36 of optical holder 30. Cover 39 is then attached to body 36 by means of fasteners 33. Optical holder 30 is then placed in chamber 12 of coating apparatus 10 with the coaxial portion 32 inserted into the connecting element 31 of motor 16. As indicated previously, portion 32 is locked to connecting element 31 such that rotational motion is imparted to optical holder 30 as rotational connecting element 31 is rotated by motor 16.

With the optical element 20 mounted in optical holder 30, the optical asphere 22 is once again blown off with destatistized filtered $N_2$ and examined microscopically to determine whether any impurities are yet present. If impurities are present, then the optical asphere should be cleaned once again and blown off with destatistized dry $N_2$.

With a fluid dropper, cleaned with the use of acetone, deionized water, and $N_2$ blown dry or oven baked, a predetermined quantity of coating material is retrieved and dripped onto the machined optical asphere 22. The coating material is allowed to run out of the dropper before application to the optical asphere 22 so as to prevent air pockets within the coating material when the material is applied to the asphere 22. The coating material is then allowed to set on the surface for about one minute to one and a half minutes.

Although other UV curable coatings may be utilized for different applications, the preferred coating material is GAFGARD 233 Radiation Curable Coating, known as Pentaerythritol Triacrylate/Vinylpyrrolidone available from GAF Chemicals Corporation, 1361 Alps Road, Wayne, N.J. 07470, a subsidiary of GAF Corporation. When cured, the coating forms a hard coat having a refractive index which substantially matches the plastic, acrylic. The coating material is filtered once through a 0.45 micrometer filter and twice through a 0.2 micrometer filter. The coating material is applied to the optical asphere 22 without dilution.

After the coating material has been allowed to set for the predetermined time, motor 16 is started such that rotational motion is imparted to optical element holder 30. The optical holder 30 is rotated at a speed of about 1200–2000 revolutions per minute. The speed of rotation is usually, preferably about 1400 revolutions per minute. However, depending upon the characteristics of the machined optical asphere 22 and of the ridges 27 thereon, and also the characteristics of the nonconformal surface to be created, the speed varies in order to distribute the coating material properly.

As the optical holder 30 is rotated, the optical asphere 22, having its center 91 at the axis 34, is centrifugally stabilized in cavity 38 of optical holder 30 by such rotation and by reason of the position of cavity 38. The coating material on the optical asphere 22 is distributed about the optical asphere and fills the grooves between the plurality of ridges 27 of optical asphere 22 as the optical holder 30 is rotated. After the grooves are filled, the coating material forms a nonconformal surface which is nonconformal to the optical asphere 22. The nonconformal surface has a thickness which is at a minimum toward the center of the asphere and which is progressively thicker toward the asphere edges. The rotation is permitted for approximately one to one and half minutes and the actual coating material reaches a preferred thickness of about one to two microns at the asphere center 91, although portions of the nonconformal surface may have thicknesses of up to 10 microns.

This thickness gradient of the nonconformal surface allows the designer to achieve a fringe pattern that is desirable for the application for which the asphere is to be utilized. Although the thickness variations are preferably less than 10 microns, when optical wavelengths for the system are about 540 nm, such a gradient can remove slight astigmatism problems from the system by adding slight astigmatism in an appropriate direction to clear up the wavefront of the image. It should be readily apparent to one skilled in the art that variation of the speed of the rotation, the viscosity of the coating material and the surface tension of such material can be varied to accomplish different nonconformal coatings.

When the rotation stops, the optical asphere 22 is inspected and if the hard coating is properly distributed the optical element 20 is removed from the coating apparatus 10. The optical element 20 is transferred from the element holder 30 after release of cover 39 from body 36 and placed in a petri dish with a quartz cover. The optical element is then cured on a 300 watt/inch conveyorized UV curing system. It should be known that other wattages of curing lamps will perform the curing function and that the present invention is not limited to that described above.

Figure 8:
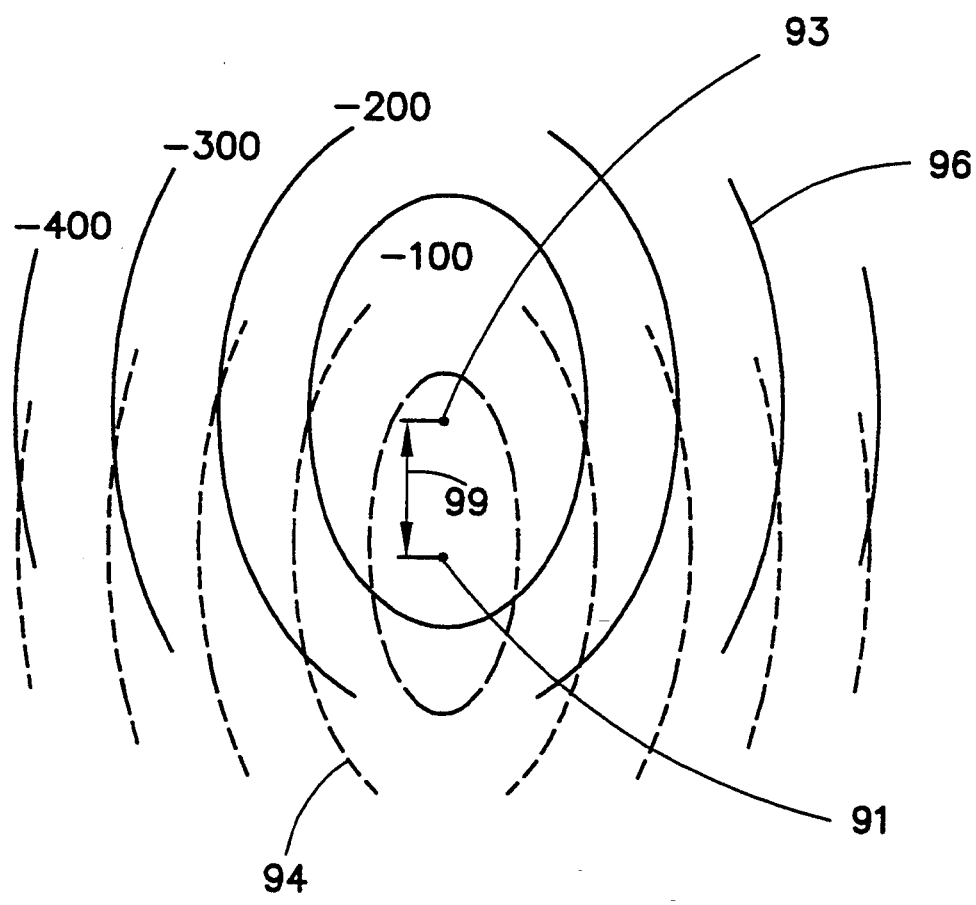
FIG. 8 is a fringe pattern diagram of an optical asphere of FIGS. 2–4 before and after the nonconformal coating surface is formed.

The spin deposition of the nonconformal coating surface on the asphere 22 with its center 91 at the axis of rotation 11 creates a desirable fringe pattern with a center 93 which is offset from the asphere center 91 as shown in FIG. 8. However, such offset of the fringe pattern and thickness gradient of the nonconformal surface can be further controlled by positioning the asphere 22 to be coated such that its center 91 is linearly offset a distance 23 from axis of rotation 34 as shown by the position of element 20A, FIG. 6. In addition, the asphere 22 could be further repositioned such that the tangent 25 of the center 91 is at an angle 27 with the axis of rotation 34 to produce additional differences in the nonconformal coating as shown by the position of element 20B, FIG. 6. Each different position would create a unique thickness gradient of the nonconformal coating surface about the asphere 22 to allow for freedom of design to a particular application. For example, with the asphere positioned as element 20B, the fringe pattern may be further offset from the asphere center because the thickness of the nonconformal surface on the asphere will generally be nonsymmetric due to the offset from the axis of rotation and angle of the tangent to the axis of rotation.

To facilitate the curing and coating process, creating a desirable nonconformal layer, the chamber 12 used for the spin deposition is completely enclosed (not shown). Part of the enclosure includes quartz windows which allow for curing of the coating material on the asphere as the asphere is being spun. Such simultaneous curing would allow the designer to judge the fringe pattern being created as the process occurs.

Those skilled in the art will recognize that only preferred embodiments of the present invention have been disclosed herein, other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A method of coating a machined surface of a plastic optical element, comprising the steps of:
    machining an optical asphere on said plastic optical element, said machining being symmetric about a center of said asphere, said machining producing a plurality of ridges about said center of said asphere, a fringe pattern of said asphere being created about said center of said asphere;
    spin depositing a nonconformal surface on said asphere for producing a fringe pattern which has a center offset a distance from said center of said asphere.

2. A method of creating a nonconformal coating on an optical asphere of a plastic optical element, said optical asphere having a center about which said optical asphere is machined, said method comprising the steps of:
    providing a holder having a rotational axis therethrough for receiving said optical elements such that said optical asphere is openly receptive to a coating material which will form the nonconformal coating;
    positioning said optical element within said holder such that said center of said optical asphere is aligned on said rotational axis and a tangent at said center of said optical asphere is at an angle to said rotational axis;
    wetting said surface with said coating material;
    spinning said holder about said rotational axis to distribute said coating material to form the nonconformal coating on said optical asphere; and
    curing said coating material distributed on said optical asphere.

3. A method according to claim 2, wherein said positioning step includes the steps of:
    providing a cavity portion in said holder for accepting said optical element such that said optical asphere is openly receptive to contact with said coating material; and
    providing support for said optical element in said cavity such that said optical element is centrifugally stabilized in a position as said holder is spun.

4. A method according to claim 3, wherein said optical element includes a combiner member having at least an upper surface, a lower surface, and said optical asphere at a first end of said member, said positioning step further including the steps of:
    cleaning all surfaces of said combiner member;
    completely masking said upper surface, lower surface, and any additional surfaces of said member other than said optical asphere; and
    positioning substantially all masked member surfaces in said cavity portion.

5. A method according to claim 2, wherein said optical asphere is machined by diamond turning, said machining producing a plurality of ridges on said optical asphere, and further wherein said spinning step includes the steps of:
    filling grooves between said plurality of ridges with said coating material as said holder is spun; and
    forming said nonconformal coating material surface on said optical asphere after said grooves are filled as said holder is spun.

6. A method of creating a nonconformal coating on an optical asphere of a plastic optical element, said optical asphere having a center about which said optical asphere is machined, said method comprising the steps of:
    providing a holder having a rotational axis therethrough for receiving said optical element such that said optical asphere is openly receptive to a coating material which will form the non-conformal coating;
    positioning said optical element within said holder such that said center of said optical asphere is offset a distance from said rotational axis;
    wetting said surface with said coating material;
    spinning said holder about said rotational axis to distribute said coating material to form the nonconformal coating on said optical asphere; and
    curing said coating material distributed on said optical asphere.

7. A method according to claim 6, wherein said positioning step includes the step of placing said optical asphere in said holder such that a tangent at said center of said optical asphere is transverse to said rotational axis.

8. A method according to claim 6, wherein said positioning step includes the step of placing said optical asphere in said holder such that a tangent at said center of said optical asphere is at an angle to said rotational axis.

9. A method according to claim 6, wherein said positioning step includes the steps of:
    providing a cavity portion in said holder for accepting said optical element such that said optical asphere is openly receptive to contact with said coating material; and
    providing support for said optical element in said cavity such that said element is centrifugally stabilized in a position as said holder is spun.

10. A method according to claim 9, wherein said optical element includes a combiner member having at least an upper surface, a lower surface, and said optical asphere at a first end of said member, said positioning step further includes the steps of:
    cleaning all surfaces of said combiner member;
    completely masking said upper surface, lower surface, and any additional surfaces of said member other than said optical asphere; and
    positioning substantially all masked member surfaces in said cavity portion.

11. A method according to claim 6, wherein said optical asphere is machined by diamond turning, said machining producing a plurality of ridges on said optical asphere, and further wherein said spinning step includes the steps of:
    filling grooves between said plurality of ridges with said coating material as said holder is spun; and forming said nonconformal coating material surface on said optical asphere after said grooves are filled as said holder is spun.

12. A method according to claim 11, wherein said positioning step includes placing said optical asphere in said holder such that a tangent at said center of said asphere is transverse to said rotational axis.

13. A method according to claim 11, wherein said positioning step includes placing said optical asphere in said holder such that a tangent at said center of said asphere is at an angle to said rotational axis.

14. An apparatus for creating a non-conformal coating on an optical asphere of a plastic optical element with a coating material, the optical asphere having a center about which the optical asphere is machined, said apparatus comprising:
   a holding member having a rotational axis therethrough and a cavity portion for accepting the optical element therein, said cavity being positioned such that the optical asphere of said optical element is openly receptive to the coating material and the center of the optical asphere is substantially positioned on said rotational axis such that a tangent at the center lies at an angle to said rotational axis when the optical element is inserted in said cavity;
   means for applying the coating material to the optical asphere;
   means for rotating said holding member about said rotational axis to form the a nonconformal coating on the optical asphere; and
   means for curing the nonconformal coating.

15. An apparatus according to claim 14, wherein said cavity of said holding member is positioned at an angle with respect to said rotational axis such that the optical element is held in said cavity by centrifugal force as said holding member is rotated by said rotating means.

16. An apparatus for creating a nonconformal coating an optical asphere of a plastic optical element with a coating material, the optical asphere having a center about which the optical asphere is machined, said apparatus comprising:
   a holding member having a rotational axis therethrough and a cavity portion for accepting the optical element therein, said cavity being positioned such that the optical asphere of said optical element is openly receptive to the coating material and the center of the optical asphere is offset a distance from said rotational axis when the optical element is inserted in said cavity;
   means for applying the coating material to the optical asphere;
   means for rotating said holding member about said rotational axis to form the nonconformal coating material surface on the optical asphere; and
   means for curing the nonconformal coating.

17. An apparatus according to claim 16, wherein said cavity is positioned such that a tangent at the center lies transverse to said rotational axis.

18. An apparatus according to claim 16, wherein said cavity is positioned such that a tangent at said the lies at an angle to said rotational axis.

19. An apparatus according to claim 16, wherein said cavity of said holding member is positioned at an angle with respect to said rotational axis such that the optical element is held in said cavity by centrifugal force as said holding member is rotated by said rotating means.

* * * * *